US008091121B2

(12) United States Patent
Lioy

(10) Patent No.: US 8,091,121 B2
(45) Date of Patent: Jan. 3, 2012

(54) METHOD AND APPARATUS FOR SUPPORTING DIFFERENT AUTHENTICATION CREDENTIALS

(75) Inventor: Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1269 days.

(21) Appl. No.: 11/566,023

(22) Filed: Dec. 1, 2006

(65) Prior Publication Data

US 2007/0157296 A1    Jul. 5, 2007

Related U.S. Application Data

(60) Provisional application No. 60/742,130, filed on Dec. 1, 2005.

(51) Int. Cl.
*G06F 17/30* (2006.01)

(52) U.S. Cl. ............. 726/5; 726/2; 726/3; 726/4; 726/6; 726/7; 726/8; 713/168; 713/169; 713/170; 713/171; 713/172; 713/173; 713/174; 713/182; 713/183; 713/184; 713/185; 713/186; 709/225; 709/229

(58) Field of Classification Search .......... 713/182–186, 713/150–152, 168–174; 709/223, 217, 219, 709/225, 229; 726/16–20, 2–8; 725/225, 725/229; 380/270
See application file for complete search history.

(56) References Cited

U.S. PATENT DOCUMENTS

| 6,151,628 A * | 11/2000 | Xu et al. ................. | 709/225 |
| 6,523,696 B1 * | 2/2003 | Saito et al. .............. | 709/223 |
| 2004/0032844 A1 * | 2/2004 | Lewis et al. ............. | 370/338 |

FOREIGN PATENT DOCUMENTS

| JP | 10145354 A | 5/1998 |
| JP | 2002111773 A | 4/2002 |
| JP | 2003516058 | 5/2003 |
| JP | 2003520501 | 7/2003 |
| JP | 2007513585 | 5/2007 |
| JP | 2007529182 T | 10/2007 |
| WO | 0141470 | * 6/2001 |
| WO | 2005057980 | * 6/2005 |

OTHER PUBLICATIONS

Written Opinion—PCT/US2006/061524, International Search Authority, European Patent Office, Dec. 28, 2007.
International Search Report—PCT/US06/061524—International Search Authority—European Patent Office—Dec. 28, 2007.

* cited by examiner

*Primary Examiner* — Taghi Arani
*Assistant Examiner* — Josnel Jeudy
(74) *Attorney, Agent, or Firm* — Donald C. Kordich; James T. Hagler

(57) ABSTRACT

Techniques for supporting concurrent data services with different credentials are described. A wireless communication network authenticates a user/device whenever new credentials are used. An access terminal sends first credentials via a Point-to-Point Protocol (PPP) link to a Packet Data Serving Node (PDSN) and receives an indication of successful authentication for a first data service based on the first credentials. The access terminal may receive a request for a second data service and second credentials from an internal application or a terminal device coupled to the access terminal. The access terminal then sends the second credentials via the PPP link to the PDSN while the first data service is ongoing. The access terminal receives from the PDSN an indication of successful authentication for the second data service based on the second credentials. The access terminal may send a Configure-Request packet or an Authenticate-Request packet to trigger or initiate authentication by the PDSN for the second data service.

19 Claims, 8 Drawing Sheets

METHOD AND APPARATUS FOR SUPPORTING DIFFERENT AUTHENTICATION CREDENTIALS

The present application claims priority to provisional U.S. Application Ser. No. 60/742,130, entitled "Method for supporting IMS connectivity on an AT and general Internet connectivity to a TD when each service requires different link authentication credentials," filed Dec. 1, 2005, assigned to the assignee hereof and incorporated herein by reference.

BACKGROUND

I. Field

The present disclosure relates generally to data communication, and more specifically to techniques for supporting data services.

II. Background

Wireless communication networks are widely deployed to provide various data services for access terminals. A data service may be any service offered by a network and involving exchanges of data. Examples of such data services include voice, video, general Internet connectivity, multimedia streaming and broadcast services, Short Message Service (SMS) and text messaging services, geographic position-based services, etc. The spectrum of data services and their capabilities continue to grow at a rapid pace, and new data applications are continually developed to exploit these data services.

An access terminal may communicate with a wireless network to obtain a data service, e.g., an Internet Protocol (IP) based service such as Voice-over-IP (VoIP). The access terminal may be coupled to a terminal device and used by the terminal device to obtain another data service, e.g., general Internet service. The two data services may be obtained via different networks and may use different credentials. Credentials are information used to verify/authenticate a given user/device. Credentials typically include identification information (e.g., a username) and secret information (e.g., a password) that can verify the identification information. It is desirable to support different data services concurrently on the access terminal and the terminal device even if these data services use different credentials.

SUMMARY

Techniques for supporting concurrent data services with different credentials are described herein. Different credentials may be supported by having a wireless communication network authenticates a user/device whenever new credentials are applicable. The authentication with the new credentials may be triggered and performed in different manners for different authentication protocols.

In an aspect, an access terminal sends first credentials via a Point-to-Point Protocol (PPP) link to a Packet Data Serving Node (PDSN) and receives from the PDSN an indication of successful authentication for a first data service based on the first credentials. The access terminal may receive a request for a second data service and second credentials from an internal application or a terminal device coupled to the access terminal. The access terminal then sends the second credentials via the PPP link to the PDSN while the first data service is ongoing (or continues to be established). The access terminal then receives from the PDSN an indication of successful authentication for the second data service based on the second credentials.

The access terminal may perform authentication with the PDSN using Challenge-Handshake Authentication Protocol (CHAP). In this case, the access terminal may send a Configure-Request packet to trigger authentication by the PDSN for the second data service. The access terminal may then receive a CHAP Challenge packet from the PDSN and, in response, send a CHAP Response packet with the second credentials to the PDSN. Alternatively, the access terminal may perform authentication with the PDSN using Password Authentication Protocol (PAP). In this case, the access terminal may send a PAP Authenticate-Request packet with the second credentials to initiate authentication by the PDSN for the second data service.

The first data service may be any data service, e.g., an IP Multimedia Subsystem (IMS) service, and may be obtained by the access terminal from a first network, e.g., a wireless network. The second data service may also be any data service, e.g., general Internet service, and may be obtained by the internal application or the terminal device from the first network or a second network, e.g., an Internet service provider (ISP) network. A first network-layer protocol, e.g., IP Version 6 (IPv6), may be configured for the first data service using a first Network Control Protocol (NCP), e.g., IP Version 6 Control Protocol (IPv6CP) for IPv6. A second network-layer protocol, e.g., IP Version 4 (IPv4), may be configured for the second data service using a second NCP, e.g., Internet Protocol Control Protocol (IPCP) for IPv4.

Various aspects and features of the disclosure are described in further detail below.

DETAILED DESCRIPTION

The techniques described herein may be used for various wireless communication networks. The terms "network" and "system" are often used interchangeably. For example, the techniques may be used for Code Division Multiple Access (CDMA) networks, Time Division Multiple Access (TDMA) networks, Frequency Division Multiple Access (FDMA) networks, Orthogonal FDMA (OFDMA) networks, etc. A CDMA network may implement a radio technology such as cdma2000, Wideband-CDMA (W-CDMA), etc. cdma2000 covers IS-2000, IS-95, and IS-856 standards. A TDMA network may implement a radio technology such as Global System for Mobile Communications (GSM), Digital Advanced Mobile Phone System (D-AMPS), etc. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, the techniques are described below for a cdma2000 network that implements the cdma2000 family of standards. In cdma2000, IS-2000 Releases 0 and A are commonly referred to as CDMA2000 1X (or simply, 1X), IS-2000 Release C is commonly referred to as CDMA2000 1xEV-DV (or simply, 1xEV-DV), and IS-856 is commonly referred to as CDMA2000 1xEV-DO (or simply, 1xEV-DO).

Figure 1:
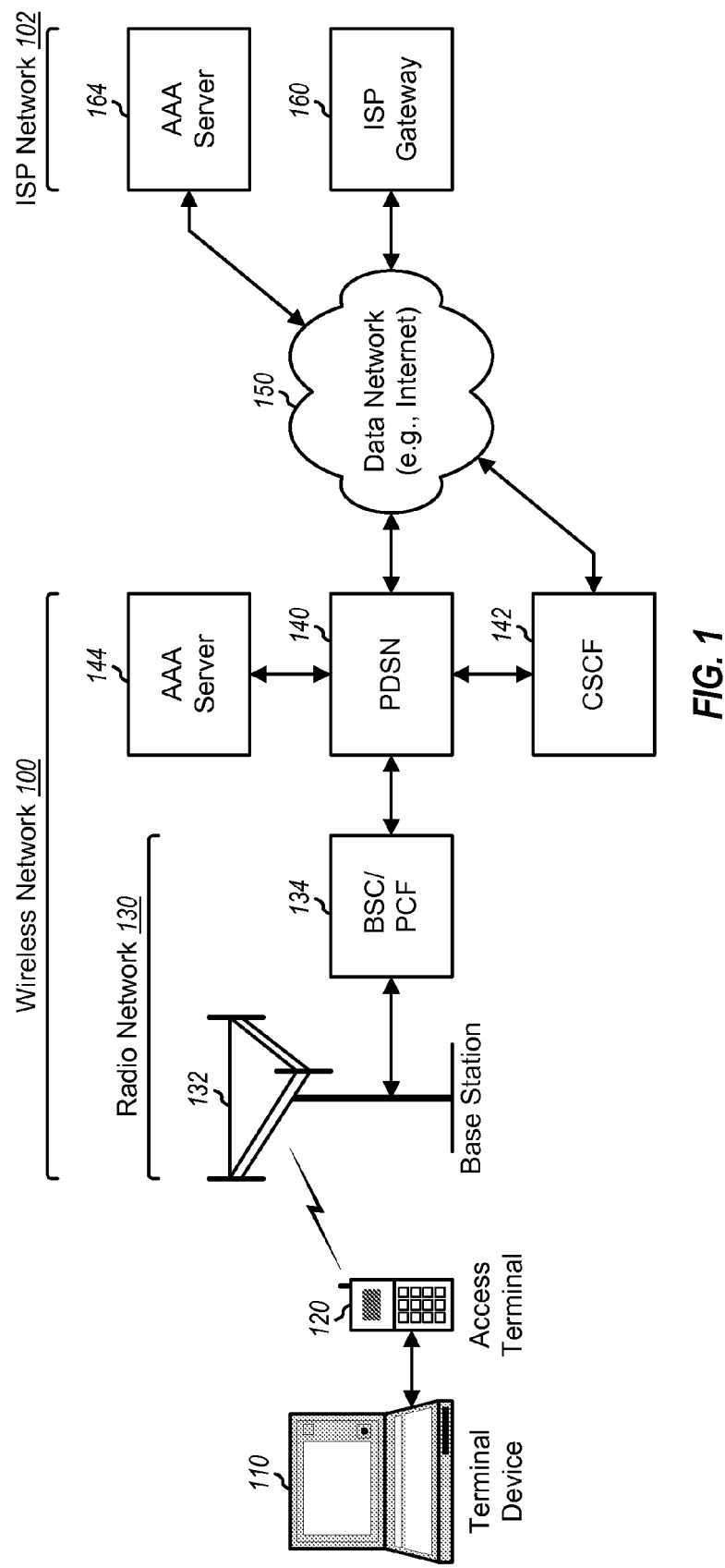
FIG. 1 shows a wireless network and an ISP network.

FIG. 1 shows a deployment with a wireless network 100 and an ISP network 102. An access terminal 120 may communicate with wireless network 100 to obtain data services supported by wireless network 100 and/or ISP network 102. Access terminal 120 may also be referred to as a mobile station, a user equipment, a user terminal, a subscriber unit, a station, etc. Access terminal 120 may be a cellular phone, personal digital assistant (PDA), a data card, or some other device that is capable of providing access to a wireless network.

Access terminal 120 may be coupled to a terminal device 110 via a wireline connection (as shown in FIG. 1) or a wireless connection. Terminal device 110 may also be referred to as a terminal equipment, a TE2 device, etc. Terminal device 110 may be a laptop computer, a PDA, or some other computing device. Terminal device 110 may communicate with access terminal 120 using various hardware and/or software interconnections. When terminal device 110 is coupled to access terminal 120, a mobile user may obtain various data services via terminal device 110. To obtain these data services, terminal device 110 communicates with access terminal 120, which further communicates with wireless network 100, which may further exchange data with other networks, e.g., ISP network 102. Access terminal 120 provides radio communication, and terminal device 110 supports end-to-end communication for the data services.

Wireless network 100 includes a radio network 130 that supports radio communication for access terminals and network entities that perform various functions to support various services. Radio network 130 includes a base station 132 that communicates with access terminals and a Base Station Controller/Packet Control Function (BSC/PCF) 134 that provides coordination and control and routes packet data for the base stations under its control. A PDSN 140 supports data services for access terminals in wireless network 100. For example, PDSN 140 may be responsible for the establishment, maintenance, and termination of PPP sessions for access terminals and may further assign dynamic IP addresses to the access terminals. PDSN 140 may couple to a data network 150, which may comprise the Internet, private data networks, and/or public data networks. PDSN 140 can communicate with various entities via data network 150.

A Call Session Control Function (CSCF) 142 performs various functions to support IMS services such as VoIP, multimedia, etc. CSCF 142 may accept requests and service them internally or forwards them to other entities, route requests from another network, perform session control services for access terminals, maintain session state to support IMS services, etc. An Authentication, Authorization, and Accounting (AAA) server 144 verifies/authenticates access terminals requesting access to data services, authorizes or denies access requests (e.g., based on service subscriptions), and provides responses granting or denying access. Wireless network 100 and radio network 130 may include other network entities that are not shown in FIG. 1 for simplicity.

ISP network 102 includes an ISP gateway 160 and an AAA server 164. ISP gateway 160 may receive requests from devices to access ISP servers (not shown in FIG. 1) and may route data between the requesting devices and the ISP servers. PDSN 140 may communicate with ISP gateway 160 via data network 150 (as shown in FIG. 1), or via a dedicated link such as a leased line or a VPN-like connection, or via some other means. AAA server 164 performs authentication and authorization for ISP network 102. ISP network 102 may also include other network entities that are not shown in FIG. 1 for simplicity.

Figure 2:
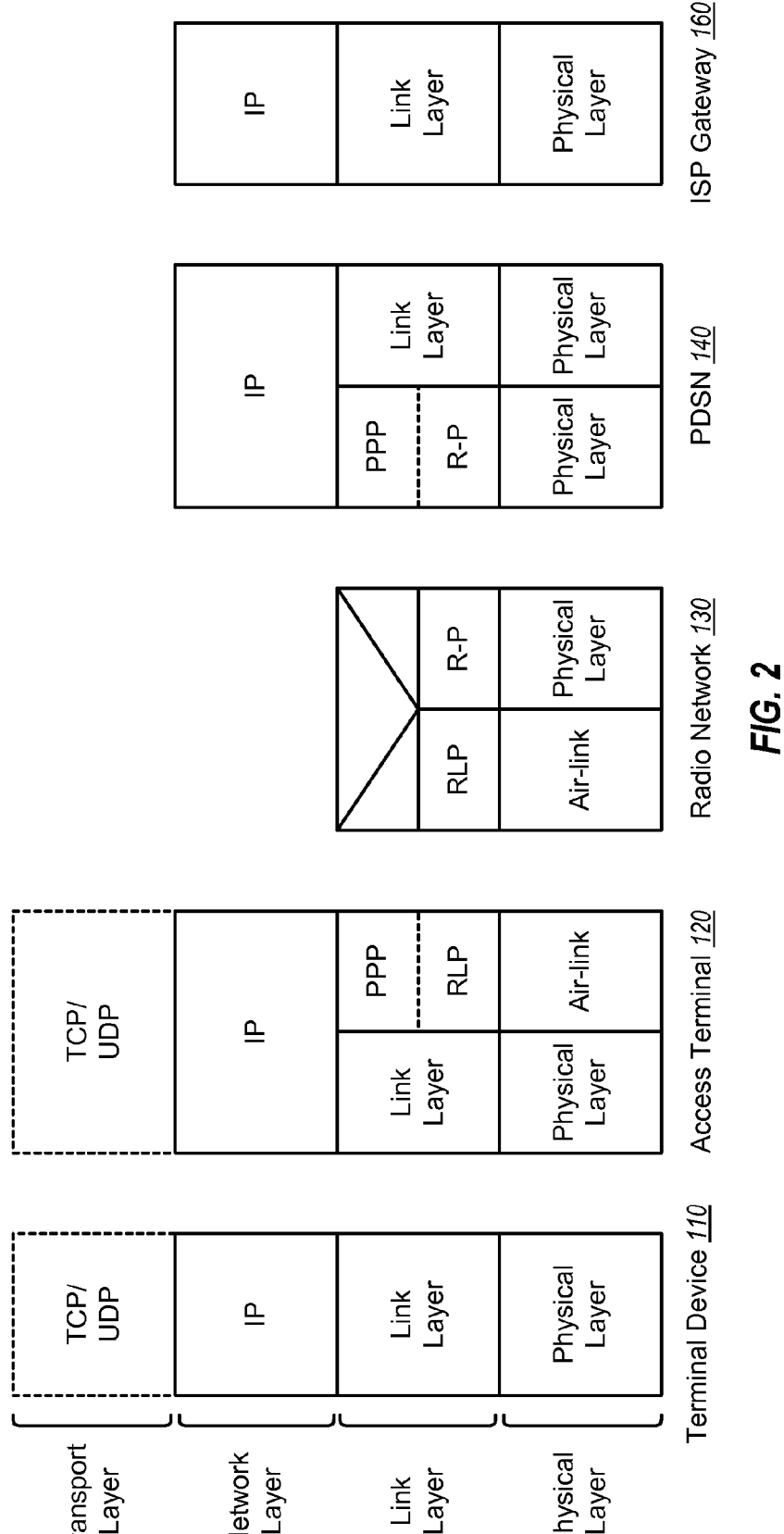
FIG. 2 shows protocol stacks at various entities in FIG. 1.

FIG. 2 shows example protocol stacks at various entities in FIG. 1. The protocol stack for each entity may include a transport layer, a network layer, a link layer, and a physical layer.

Terminal device 110 and access terminal 120 may communicate with a remote device or server using Transmission Control Protocol (TCP), User Datagram Protocol (UDP), or some other protocol at the transport layer. TCP and UDP typically operate on top of IP at the network layer. Transport layer data (e.g., for TCP and/or UDP) is encapsulated in IP packets, which are exchanged by terminal device 110 and access terminal 120 with the remote device/server via radio network 130, PDSN 140, and possibly ISP gateway 160.

The link layer between terminal device 110 and access terminal 120 may be Ethernet or some other protocol that operates on top of a physical layer. The link layer between access terminal 120 and radio network 130 is typically dependent on the radio technology used by the radio network. For cdma2000, the link layer is implemented with PPP over a Radio Link Protocol (RLP). Access terminal 120 maintains a PPP session/link with PDSN 140 for a data session and communicates with radio network 130 via RLP for data exchanges. RLP operates on top of an air-link interface (e.g., IS-2000 or IS-856 in cdma2000). Radio network 130 communicates with PDSN 140 via a technology-dependent interface (e.g., an "R-P" interface in cdma2000) that operates on top of a physical layer. PDSN 140 may communicate with ISP gateway 160 via IP over a link layer and a physical layer. Access terminal 120 may register with wireless network 100 for IMS at power up so that the access terminal is reachable for all IMS services that are available. After registering for IMS, access terminal 120 may maintain an open data connection with wireless network 100 at all times so that another device can reach the access terminal, e.g., for VoIP, Instant Messaging (IM), etc. Access terminal 120 may thus maintain an open data connection after registering for IMS in order to remain reachable and may or may not be actively engaged in a data service.

Figure 3:
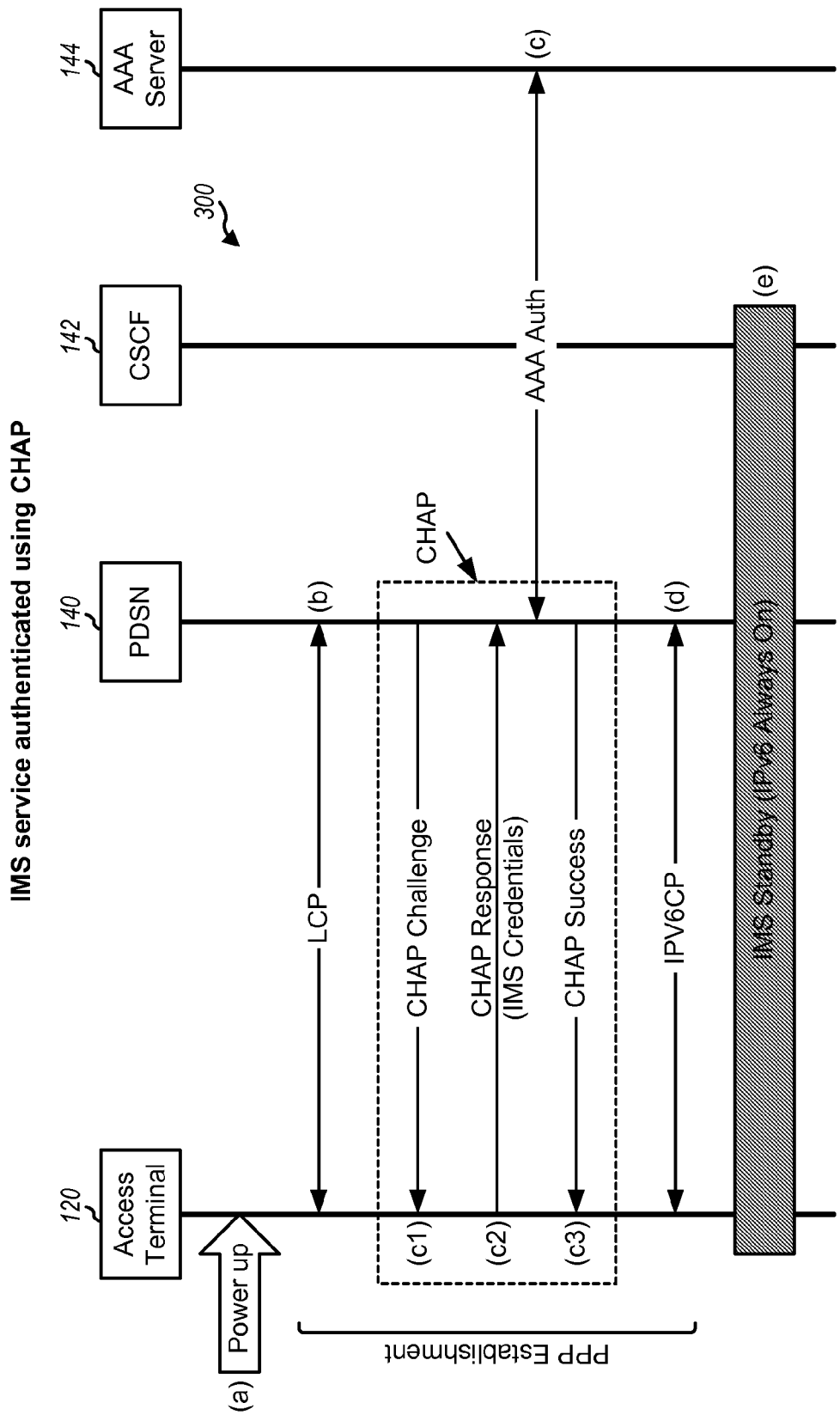
FIG. 3 shows a call flow for a packet data call for an IMS service.

FIG. 3 shows a call flow 300 for a packet data call originated by access terminal 120 for IMS registration. Access terminal 120 receives a request to originate the packet data call, e.g., at power up of access terminal 120 (step a). Access terminal 120 then exchanges signaling with radio network 130 (not shown in FIG. 1) to establish a radio link, e.g., to set up traffic channels.

Access terminal 120 then exchanges signaling with PDSN 140 to establish a PPP session/link and to configure a network-layer protocol. The PPP establishment is composed of three phases—a link establishment phase, an authentication phase, and a network-layer protocol phase. The three phases are described in Request for Comments (RFC) 1661, entitled "The Point-to-Point Protocol (PPP)," which is publicly available.

The link establishment phase is performed using Link Control Protocol (LCP) to establish, configure, and test a data-link connection between access terminal 120 and PDSN 140 (step b). In this phase, access terminal 120 sends one or more LCP Configure packets to PDSN 140 and listens for an LCP Configure-Ack packet from the PDSN. Similarly, PDSN 140 sends one or more LCP Configure packets to access terminal 120 and listens for an LCP Configure-Ack packet from the access terminal. The link establishment phase is completed when both access terminal 120 and PDSN 140 receive LCP Configure-Ack packets. The link establishment phase may identify a specific authentication protocol to use in the authentication phase.

The authentication phase is optional for PPP and may be performed after completion of the link establishment phase (step c). This phase may authenticate access terminal 120 using CHAP, PAP, or some other authentication protocol. For CHAP, which is shown in FIG. 3, PDSN 140 sends to access terminal 120 a CHAP Challenge packet containing a random challenge value generated by PDSN 140 (step c1). Access terminal 120 then returns a CHAP Response packet containing IMS credentials, a challenge response value generated based on the challenge value obtained from the CHAP Challenge packet, and a shared key/password (step c2). The IMS credentials may comprise an identifier and a password to be used to authenticate access terminal 120 and to determine whether access terminal 120 is authorized for IMS. PDSN 140 may also compute the challenge response value. The computed challenge response value is compared against the received challenge response value and, if the computed and received values are equal, then access terminal 120 is authenticated. PDSN 140 would then return a CHAP Success packet (step c3). Otherwise, PDSN 140 would return a CHAP Failure packet (not shown in FIG. 3). PDSN 140 may send CHAP Challenge packets at any time during the data session. CHAP is described in RFC 1994, entitled "PPP Challenge Handshake Authentication Protocol (CHAP)," which is publicly available.

For PAP, which is not shown in FIG. 3, access terminal 120 would send its IMS credentials in a PAP Authenticate-Request packet to PDSN 140. PDSN 140 may then perform authentication based on the IMS credentials and would return a PAP Authenticate-Ack (or Nak) packet to indicate successful (or failed) authentication. Access terminal 120 may repeatedly send the IMS credentials "in the clear" until the authentication is acknowledged. Access terminal 120 may decide when and how often to send PAP Authenticate-Request packets to PDSN 140. PAP is described in RFC 1334, entitled "PPP Authentication Protocols," which is publicly available.

PDSN 140 may connect to AAA server 144 during the authentication phase and exchange signaling with AAA server 144 to validate the credentials (also step c). PDSN 140 may use the username and/or a network access identifier (NAI) to identify which AAA server to use, which in this example is AAA server 144. PDSN 140 may then forward the information (e.g., the challenge and response) to AAA server 144, which may then authenticate the credentials. In general, the authentication phase at the PPP level authenticates the link/device whereas higher layer authenticates a specific data service. However, the PPP level may also be used to facilitate authentication for the higher layer as described below. In any case, the authorization for IMS may be based on the IMS credentials sent by access terminal 120 in step c2.

The network-layer protocol phase is performed after completion of the authentication phase and uses a Network Control Protocol (NCP) (step d). This phase may establish and configure any one of various network-layer protocols such as IP Version 4 (IPv4), IP Version 6 (IPv6), Internet Packet exchange protocol (IPX), AppleTalk, etc. A family of NCPs exists within PPP, and each NCP is defined to configure a different network-layer protocol (such as those defined above). For example, IPv4 may be configured with Internet Protocol Control Protocol (IPCP), which is described in RFC 1332, entitled "The PPP Internet Protocol Control Protocol (IPCP)." IPv6 may be configured with IP Version 6 Control Protocol (IPv6CP), which is described in RFC 2472, entitled "IP Version 6 over PPP." These RFC documents are publicly available. The network-layer protocol phase configures pertinent parameters to use for the selected network-layer protocol. In the example shown in FIG. 3, since IMS uses IPv6, this phase configures IPv6 parameters using IPv6CP.

After completing the network-layer protocol phase, access terminal 120 has a PPP session/link with PDSN 140. The PPP session may be opened for any duration of time until it is terminated by access terminal 120 or PDSN 140. Access terminal 120 may exchange IMS signaling with CSCF 142 to set up IMS (not shown in FIG. 3). Access terminal 120 may thereafter exchange IPv6 packets with CSCF 142 via PDSN 140 for IMS (step e).

FIG. 3 shows a simple case in which access terminal 120 may obtain an IMS service via PDSN 140. At noted above, access terminal 120 may be used to obtain data connectivity for applications executing in access terminal 120 as well as applications executing in terminal device 110. There may be situations in which access terminal 120 has active IMS applications while terminal device 110 has applications desiring data connectivity. For example, access terminal 120 may have a VoIP call with wireless network 100, and terminal device 110 may desire general Internet service from ISP network 102. As another example, access terminal 120 may have an open data connection for IMS as described above. The user may not be aware of this open data connection if the user is not actively engaged in any data services via access terminal 120 and may wish to obtain general Internet connectivity via terminal device 110.

In the above examples, the general Internet connectivity may be provided by a third party, instead of the wireless network operator, and may use different credentials than the credentials used by the wireless network operator. For example, ISP network 102 may require terminal device 110 to authenticate itself to the ISP network using ISP credentials, which may be provisioned at terminal device 110 and applicable for ISP network 102. Access terminal 120 may be provisioned with IMS credentials that may be applicable for wireless network 100. The credentials used for IMS applications at access terminal 120 may belong to the operator of wireless network 100, while the ISP credentials used for Internet service at terminal device 110 may belong to the ISP.

In cdma2000, access credentials are typically provided during the authentication phase of PPP establishment, e.g., as shown in FIG. 3. PPP does not provide a mechanism for submitting multiple credentials, e.g., for IMS and third party ISP Internet services. Furthermore, multiple credentials may be submitted at different times and/or by different devices. For example, the IMS credentials may be stored in access terminal 120 and may be provided at power up. The ISP credentials may be stored in terminal device 110 or access terminal 120 or may be provided by a user via terminal device 110 or access terminal 120. The ISP credentials may be used when an Internet session is started either by an application on access terminal 120 or by terminal device 110 tethered to access terminal 120 and requesting the service. This request may occur some time after the IMS applications are running at access terminal 120.

In an aspect, different credentials for different data services may be supported by having wireless network 100 authenticates a user/device whenever new credentials are applicable, e.g., when general Internet service is desired after establishment of an IMS session. The authentication with the new credentials may be triggered and performed in different manners for different authentication protocols. In general, the authentication with the new credentials may be performed with any authentication protocol that can be run at an arbitrary time during the data session.

Figure 4:
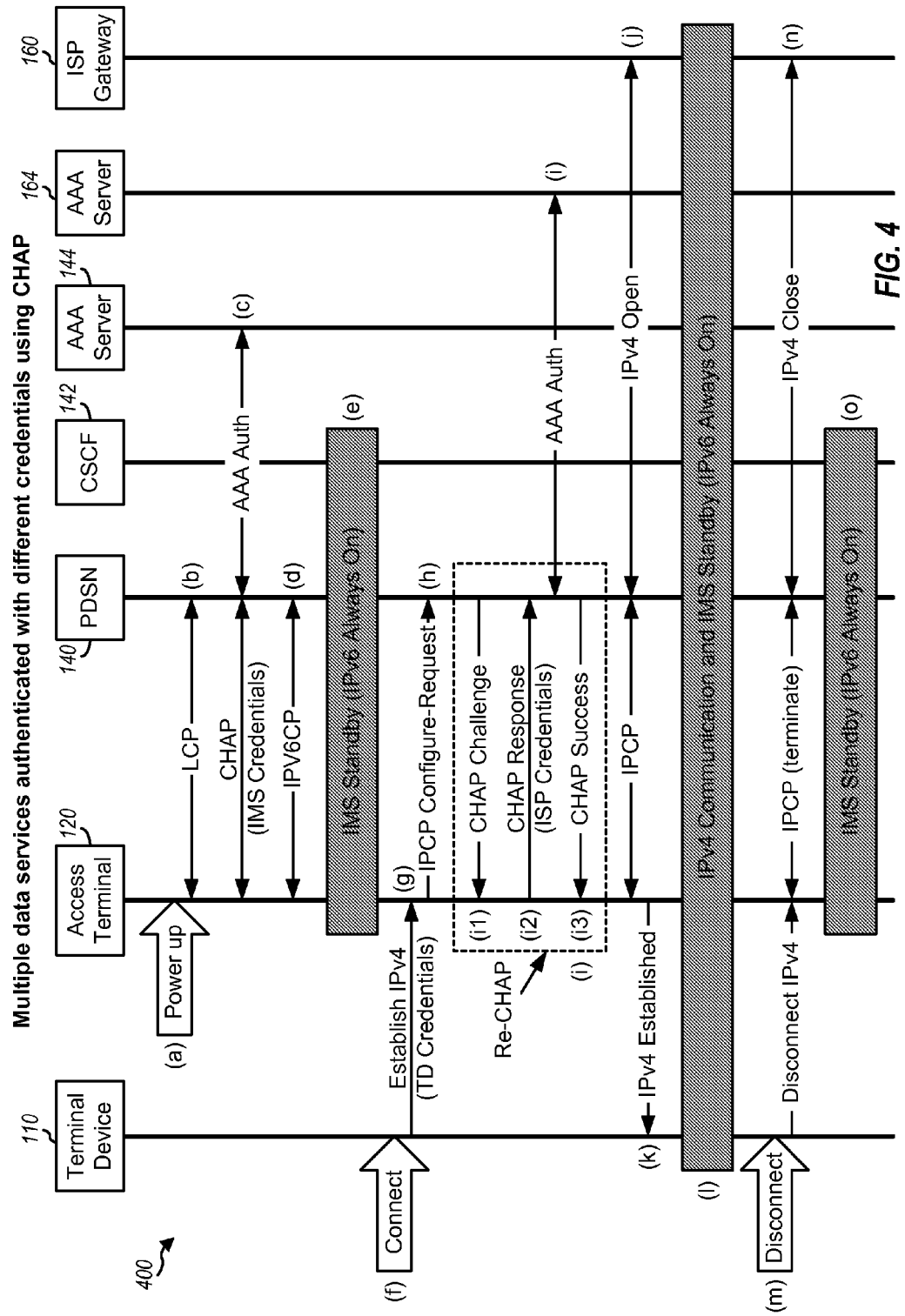
FIG. 4 shows a call flow for supporting different credentials using CHAP.

FIG. 4 shows a call flow 400 for supporting different credentials using CHAP. Access terminal 120 receives a request to originate a packet data call for an IMS service (step a) and exchanges signaling with radio network 130 to establish a radio link. Access terminal 120 then exchanges LCP packets with PDSN 140 to establish, configure, and test a data-link connection (step b). Access terminal 120 is authenticated by PDSN 140 using CHAP and is authorized for the requested IMS service by AAA server 144 based on IMS credentials provided by access terminal 120 (step c). Access terminal 120 then exchanges IPv6CP packets with PDSN 140 to configure IPv6 for IMS (step d). Access terminal 120 also exchanges IMS signaling with CSCF 142 to set up IMS and thereafter obtains the IMS service via PDSN 140 and CSCF 142 (step e).

At a later time, terminal device 110 is attached to access terminal 120 and receives a request for Internet service, e.g., from a user or an application running at terminal device 110 (step f). Terminal device 110 then sends to access terminal 120 a connection request to establish IPv4 for the Internet service (step g). This connection request may include authentication information (e.g., ISP credentials to use for authentication for the Internet service), connection information (e.g., NAI, identity or address ISP network 102), etc. The connection request triggers access terminal 120 to send an IPCP Configure-Request packet to establish IPv4, which is used for the Internet service for terminal device 110 (step h). Although not shown in FIG. 4, the connection request may also be sent by an application running at access terminal 120 or a user via access terminal 120.

The ISP credentials are used to verify that the user is allowed to use the requested data service, which in this example is general Internet connectivity. The ISP credentials belong to the user. Access terminal 120 behaves as (a) a gateway by taking the ISP credentials from terminal device 110 and forwarding them to wireless network 100 and (b) a proxy by using another protocol for the ISP credentials transfer.

The IPCP Configure-Request packet triggers PDSN 140 to re-CHAP access terminal 120 (step i). Re-CHAPing is typically used to re-authenticate a user/device with CHAP. In this case, Re-CHAPing is used for authentication for another data service with different credentials. For the re-CHAPing, PDSN 140 sends to access terminal 120 a CHAP Challenge packet containing a challenge value (step i1). Access terminal 120 returns a CHAP Response packet containing the ISP credentials and a challenge response value (step i2). The ISP credentials may include the username/NAI or some other information that indicates which network/domain will perform authentication. PDSN 140 may recognize that the ISP credentials are for another data service and may identify an appropriate AAA server (which in this example is AAA server 164) based on the username/NAI or some other information. PDSN 140 then forwards the received challenge response value and computed challenge response value to AAA server 164, which compares the two values and returns an indication of successful authentication if the two values are equal. PDSN 140 then returns a CHAP Success packet to access terminal 120 (step i3).

PDSN 140 may thus exchange signaling with AAA server 164 for authentication and authorization for the requested Internet service based on the ISP credentials provided by terminal device 110 and forwarded by access terminal 120 (also step i). PDSN 140 may communicate directly with AAA server 164, as shown in FIG. 4, e.g., using connection information provided by terminal device 110 or available at PDSN 140. PDSN 140 may also communicate with AAA server 144 in wireless network 100, and AAA server 144 may communicate with or act as a proxy for AAA server 164 (not shown in FIG. 4). After completing the authentication phase, access terminal 120 exchanges IPCP packets with PDSN 140 to configure IPv4 for the Internet service for terminal device 110 (step j). The NAI and successful authentication in step i also trigger PDSN 140 to "activate" the requested Internet service, e.g., PDSN 140 may set up a tunnel to ISP gateway 160 (also step j).

Step g allows terminal device 110 and access terminal 120 to pass the ISP credentials used to obtain Internet service from ISP network 102. In the example shown in FIG. 4, the ISP credentials are used during the re-CHAP operation in step i whereas the IMS credentials are used during the original CHAP operation in step c. PDSN 140 can establish Internet service with ISP gateway 160 using the ISP credentials (step j). In general, the two data services may be any types of data services, and any credentials may be used for these data services.

After completing configuration of IPv4 for the Internet service, access terminal 120 informs terminal device 110 that it is connected to ISP network 102 (step k). At this point, terminal device 110 has IPv4 Internet service with ISP network 102 while access terminal 120 has concurrent IMS (IPv6) service with wireless network 100 (step l). Access terminal 120 may exchange packets with PDSN 140 for both the IMS service for access terminal 120 and the Internet service for terminal device 110. For the IMS service, access terminal 120 may exchange packets with CSCF 142 via PDSN 140. For the Internet service, terminal device 110 may exchange packets with ISP gateway 160 via access terminal 120 and PDSN 140.

At a later time, terminal device 110 sends a disconnection request to terminate the Internet service (step m). The disconnection request triggers access terminal 120 to send an IPCP Configure-Request packet to PDSN 140 to terminate IPCP, which then results in termination of the Internet session for terminal device 110 with ISP network 102 (step n). At this point, access terminal 120 still has a connected data session for the IMS service, but terminal device 110 is no longer connected (step o).

Figure 5:
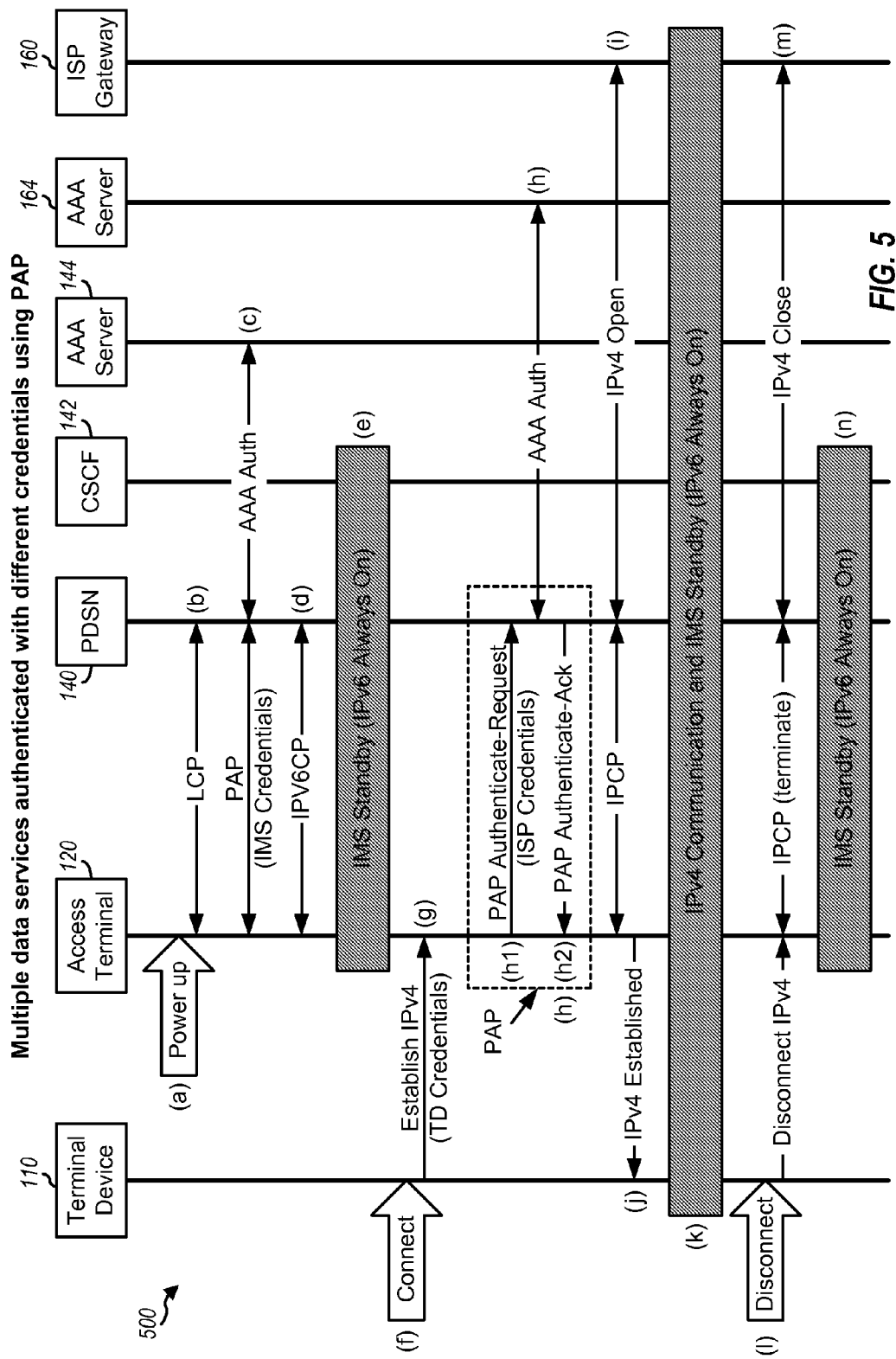
FIG. 5 shows a call flow for supporting different credentials using PAP.

FIG. 5 shows a call flow 500 for supporting different credentials using PAP. Steps a through e of call flow 500 are similar to steps a through e, respectively, of call flow 400 in FIG. 4. However, access terminal 120 is authenticated with PAP (instead of CHAP) in step c.

At a later time, terminal device 110 receives a request for Internet service (step f) and sends a connection request to establish IPv4 and its ISP credentials to access terminal 120 (step g). The connection request triggers access terminal 120 to initiate authentication for the Internet service using PAP (step h). For the authentication for the Internet service, access terminal 120 sends a PAP Authenticate-Request packet containing the ISP credentials to PDSN 140 (step h1).

PDSN 140 may exchange signaling with AAA server 164 for authentication and authorization of the requested Internet service based on the ISP credentials provided by terminal device 110 and forwarded by access terminal 120 (also step h). After receiving an indication of successful authentication from AAA server 164, PDSN 140 returns a PAP Authenticate-Ack packet to convey the successful authentication (step h2). After completing the authentication phase, access terminal 120 exchanges IPCP packets with PDSN 140 to configure IPv4 for the Internet service for terminal device 110 (step i).

Step g allows terminal device 110 and access terminal 120 to pass the ISP credentials used to obtain Internet service from ISP network 102. The ISP credentials are used during the second PAP operation in step h whereas the IMS credentials are used during the original PAP operation in step c. PDSN 140 can establish Internet service with ISP gateway 160 using the ISP credentials (step i). Steps j through n of call flow 500 are the same as steps k through o, respectively, of call flow 400 in FIG. 4.

As shown in FIGS. 4 and 5, authentication for a new data service may be triggered in different manners for different authentication protocols. CHAP is initiated by an authenticator, which is PDSN 140 in FIGS. 4 and 5. In this case, access terminal 120 may send an appropriate packet to trigger PDSN 140 to initiate authentication. The trigger packet may be a configure request packet for a network-layer protocol to be used for a new data service, e.g., an IPCP Configure-Request packet (as shown in FIG. 4), an IPv6CP Configure-Request packet, etc. In contrast, PAP is initiated by a peer being authenticated, which is access terminal 120 in FIGS. 4 and 5. Access terminal 120 may send a PAP Authenticate-Request packet at any time to initiate authentication by PDSN 140, which is not defined in RFC 1334 by may nevertheless be supported by PDSN 140. For all authentication protocols, access terminal 120 may either initiate authentication (e.g., for PAP) or trigger PDSN to initiate authentication (e.g., for CHAP) whenever a new data service with different credentials is desired.

In call flow 400 in FIG. 4 and call flow 500 in FIG. 5, different credentials for a new data service (e.g., Internet service) are provided during the authentication for the new data service. The authentication with the new credentials does not disconnect or dislodge the existing data service and credentials (e.g., for IMS service). The existing service should continue to work even though the new credentials are used during authentication for the new data service. PDSN 140 recognizes that the new service is being added and hence does not replace the existing service with the new service. PDSN 140 may also perform setup for the new data service associated with the new credentials. For example, PDSN 140 may set up a data connection to a third party network, as shown in FIGS. 4 and 5. PDSN 140 may also communicate with another entity in wireless network 100 to inform this entity that a client has been authenticated and that the client can obtain the data service. PDSN 140 may also enable traffic destined for the data service to pass through the PDSN to an appropriate server for the data service.

In the examples shown in FIGS. 4 and 5, access terminal 120 obtains IMS service with IMS credentials, and terminal device 110 obtains Internet service with ISP credentials. In general, each device may obtain any number of data services with the same or different credentials. Multiple data services may be obtained concurrently by access terminal 120, or by terminal device 110, or by both devices. For example, access terminal 120 may concurrently obtain IMS service with IMS credentials and Internet service with Internet credentials. Multiple data services may also be obtained via different networks as shown in FIGS. 4 and 5 or via the same network.

In general, any network-layer protocol may be used for each data service. In the examples shown in FIGS. 4 and 5, IPv6 is used for IMS service and IPv4 is used for Internet service. The use of different network-layer protocols for different data services may simplify routing of packets for these data services, as described below.

Access terminal 120 routes packets to allow terminal device 110 and access terminal 120 to concurrently receive different data services. Access terminal 120 may receive inbound packets from PDSN 140 for both IMS service for access terminal 120 and Internet service for terminal device 110 and may forward these packets to the appropriate destinations. If different network-layer protocols are used for the concurrent data services (e.g., IPv4 and IPv6 in the examples shown in FIGS. 4 and 5), then access terminal 120 may route the inbound packets based on the IP version of each packet. Access terminal 120 may pass inbound IPv6 packets up its protocol stack to applications running at access terminal 120 and may forward inbound IPv4 packets to terminal device 110. Each packet includes a version field that may be set to either IPv4 or IPv6. Access terminal 120 can determine the IP version of each packet based on the version field. If IPv6 is used for both data services, then access terminal 120 may route inbound packets using IPv6 addresses and/or some other information.

Access terminal 120 may also route inbound packets using network interfaces that operate between PPP and IP in the protocol stack. Each network interface may perform processing such as packet filtering, routing, bridging, etc. Routing refers to a process of examining IP addresses in a packet header and determining whether a packet is destined for a local host (which is the device doing the routing) or another host. Bridging refers to a process of passing all inbound packets to a specific host regardless of the address information. Access terminal 120 may use separate network interfaces for IPv4 and IPv6 packets. The network interface for IPv4 (or IPv4 interface) may be configured as a bridge and may pass all inbound IPv4 packets to terminal device 110. The network interface for IPv6 (or IPv6 interface) may be configured as a router and may pass inbound IPv6 packets up the protocol stack at access terminal 120. If IPv6 is used for both data services, then a separate network interface may be used for the IPv6 address that is bridged to terminal device 110.

Access terminal 120 may receive outbound packets from terminal device 110 and/or access terminal 120 for the concurrent data services. Access terminal 120 may simply forward the outbound packets to PDSN 140. No special handling is needed for the outbound packets.

Figure 6:
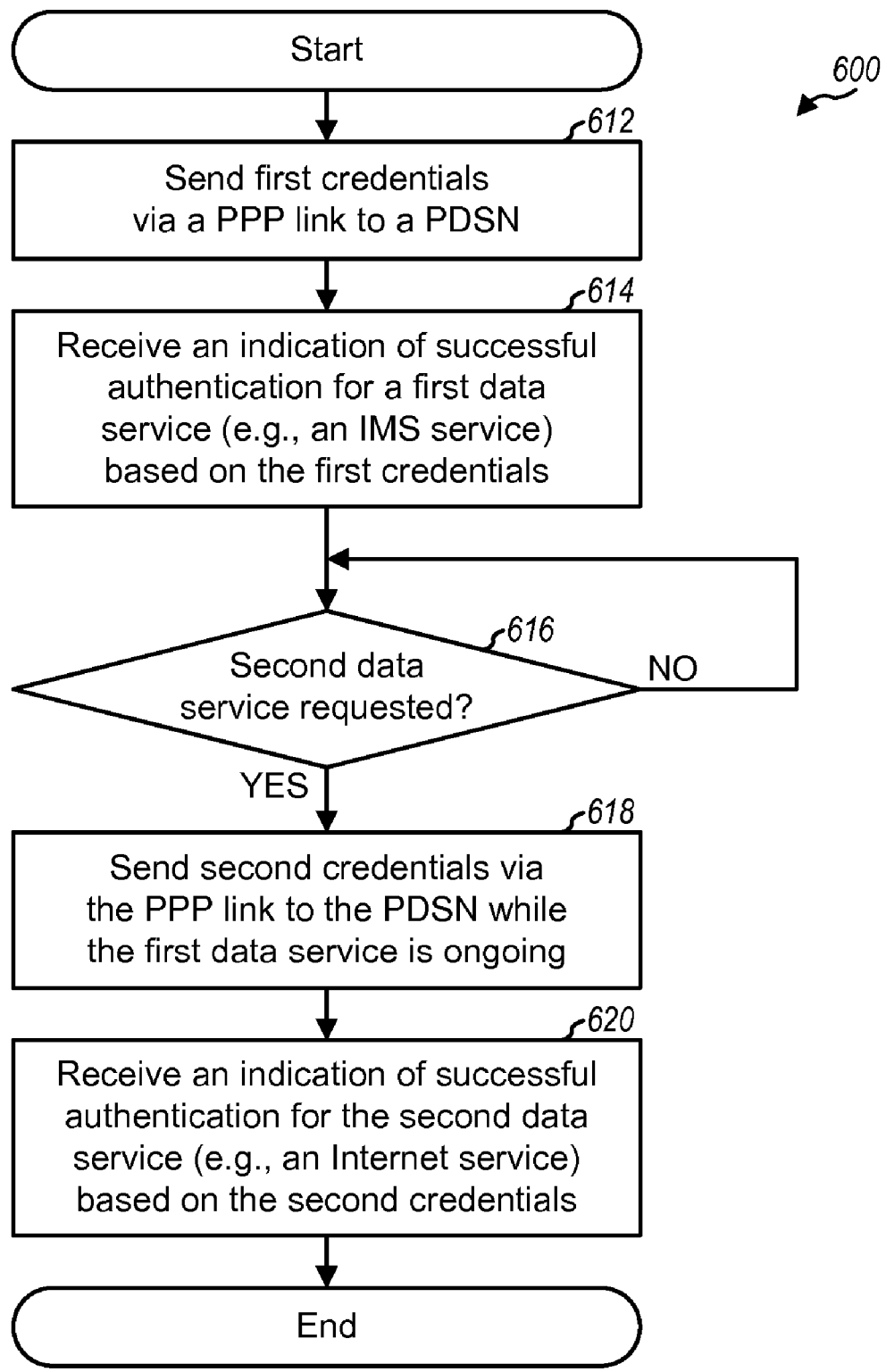
FIG. 6 shows a process performed by an access terminal to support concurrent data services with different credentials.

FIG. 6 shows a process 600 performed by access terminal 120 to support concurrent data services with different credentials. Access terminal 120 sends first credentials via a PPP link to PDSN 140 (block 612) and receives from the PDSN an indication of successful authentication for a first data service based on the first credentials (block 614). A determination is made whether a second data service is requested (block 616). If the answer is 'No', then the process returns to block 616. Otherwise, if the answer is 'Yes' for block 616, then access terminal 120 may receive the request for the second data service and second credentials from terminal device 110 (or an internal application). Access terminal 120 then sends the second credentials via the PPP link to PDSN 140 while the first data service is ongoing or continues to be established (block 618). Access terminal 120 then receives from PDSN 140 an indication of successful authentication for the second data service based on the second credentials (block 620).

If access terminal 120 is configured to perform authentication with PDSN 140 using CHAP, then for block 618, access terminal 120 may send a Configure-Request packet in IPCP or IPv6CP (depending on the second data service), which will trigger authentication by PDSN 140 for the second data service. Access terminal 120 may then receive a CHAP Challenge packet from PDSN 140 and, in response, send a CHAP Response packet with the second credentials to PDSN 140. Alternatively, if access terminal 120 is configured to perform authentication with PDSN 140 using PAP, then for block 618, access terminal 120 may send a PAP Authenticate-Request packet with the second credentials to initiate authentication by PDSN 140 for the second data service. In general, access terminal 120 may perform authentication with PDSN 140 using a first authentication protocol (e.g., CHAP or PAP) for the first data service and may perform authentication with PDSN 120 using a second authentication protocol (e.g., CHAP or PAP) for the second data service. The first authentication protocol may be the same as, or different from, the second authentication protocol.

The first data service may be any data service (e.g., an IMS service) and may be obtained by access terminal 120 from a first network. The second data service may also be any data service (e.g., an Internet service) and may be obtained by terminal device 110 or access terminal 120 from the first network or a second network. A first connection to a first network entity may be established for the first data service, and a second connection to a second network entity may be established for the second data service. A first network-layer protocol (e.g., IPv6) may be configured for the first data service using a first NCP (e.g., IPv6CP). A second network-layer protocol (e.g., IPv4) may be configured for the second data service using a second NCP (e.g., IPCP).

Access terminal 120 may receive inbound packets from PDSN 140 for the first and second data services. Access terminal 120 may pass inbound packets for the first data service up a protocol stack at access terminal 120 and may forward inbound packet for the second data service to terminal device 110. Access terminal 120 may identify inbound packets for the first and second data services based on an IP version included in each packet. Access terminal 120 may send outbound packets for the first and second data services to PDSN 140.

Figure 7:
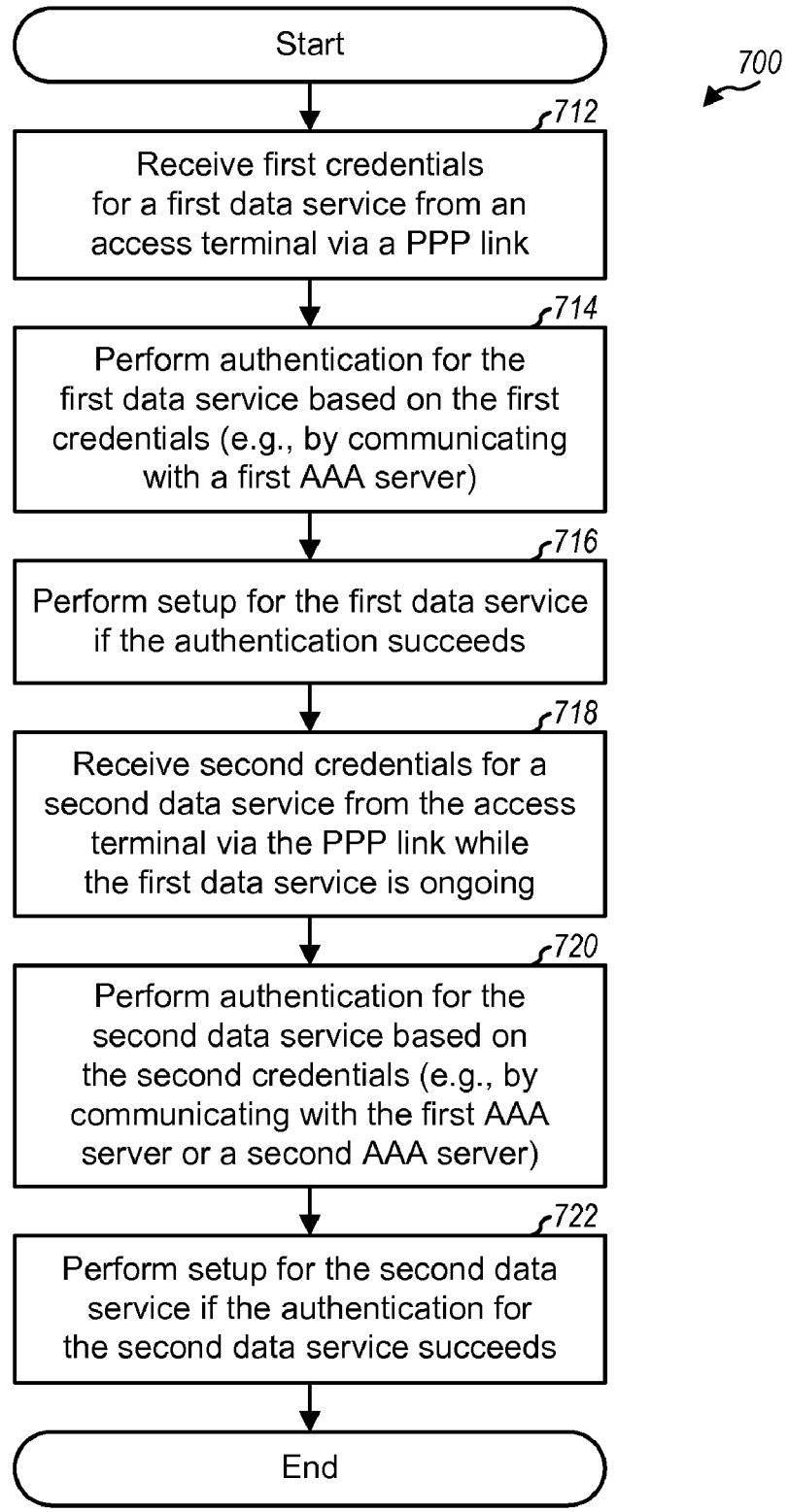
FIG. 7 shows a process performed by a PDSN to support concurrent data services with different credentials.

FIG. 7 shows a process 700 performed by PDSN 140 to support concurrent data services with different credentials. PDSN 140 receives first credentials for a first data service from access terminal 120 via a PPP link (block 712) and performs authentication for the first data service based on the first credentials (block 714). PDSN 140 may also perform setup for the first data service (e.g., set up a data connection) if the authentication succeeds (block 716). PDSN 140 receives second credentials for a second data service from access terminal 120 via the PPP link while the first data service is ongoing (block 718). PDSN 140 performs authentication for the second data service based on the second credentials (block 720). The processing by PDSN 140 for authentication of each data service may be dependent on the authentication protocol used for authentication, the network/domain designated to perform the authentication, the entity designated to perform the authentication, etc. PDSN 140 may communicate with a first AAA server for authentication for the first data service and may communicate with the first AAA server or a second AAA server for authentication for the second data service. PDSN 140 may also perform setup for the second data service (e.g., set up an IPv4 connection with ISP gateway 160) if the authentication for the second data service succeeds (block 722).

Figure 8:
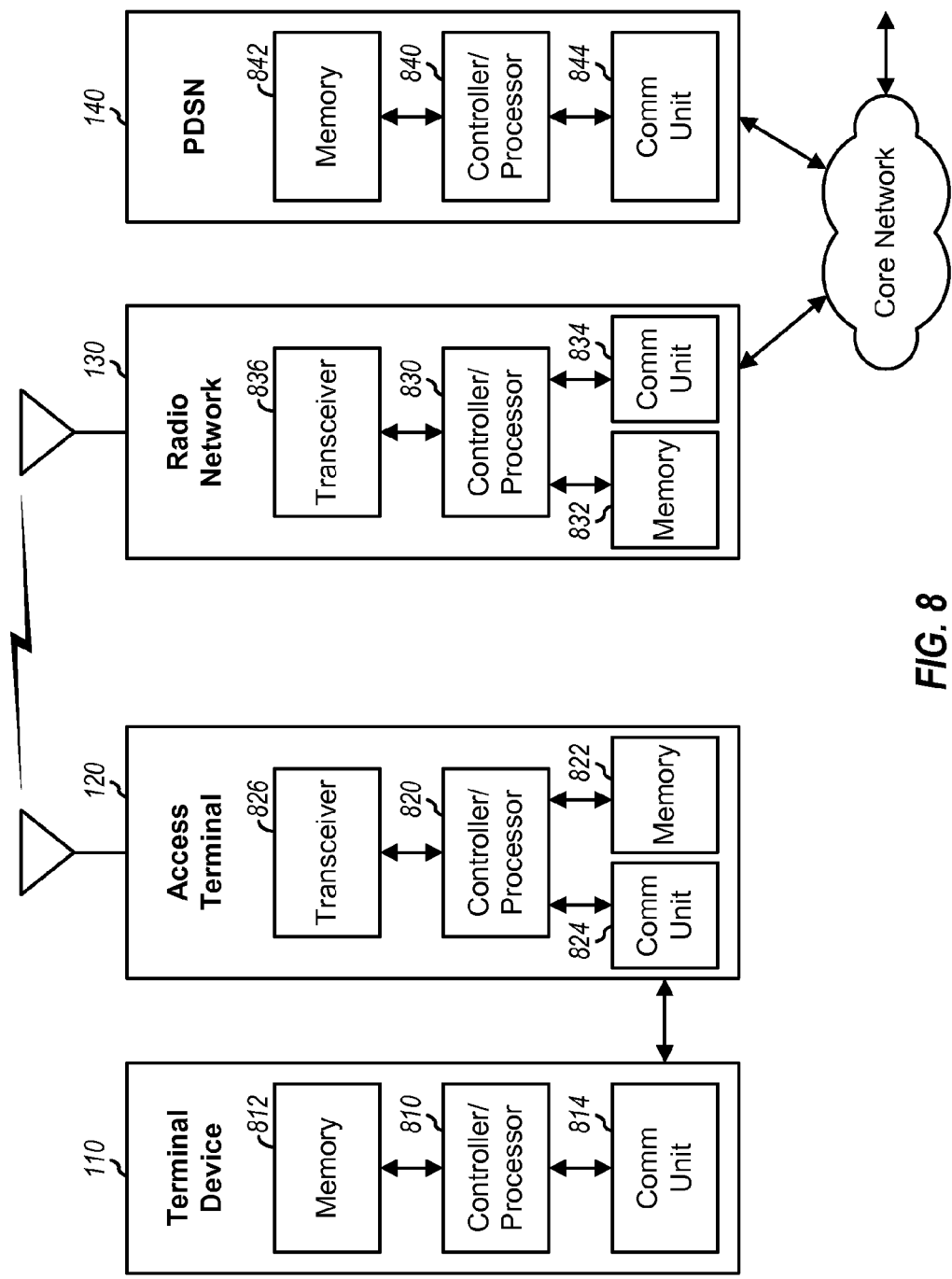
FIG. 8 shows a block diagram of various entities in FIG. 1.

PDSN 140 may perform authentication using CHAP. In this case, for block 718, PDSN 140 may receive an IPCP or IPv6CP Configure-Request packet from access terminal 120 triggering authentication for the second data service. PDSN 140 may then send a CHAP Challenge packet to access terminal 120 and may receive a CHAP Response packet with the second credentials. Alternatively, PDSN 140 may perform authentication using PAP. In this case, for block 718, PDSN 140 may receive a PAP Authenticate-Request packet with the second credentials from access terminal 120 initiating authentication for the second data service. In general, PDSN 140 may perform authentication using a first authentication protocol (e.g., CHAP or PAP) for the first data service and may perform authentication using a second authentication protocol (e.g., CHAP or PAP) for the second data service. The first authentication protocol may be the same as, or different from, the second authentication protocol FIG. 8 shows a block diagram of terminal device 110, access terminal 120, radio network 130, and PDSN 140 in FIG. 1. For simplicity, FIG. 8 shows (a) one controller/processor 810, one memory 812, and one communication (Comm) unit 814 for terminal device 110, (b) one controller/processor 820, one memory 822, one communication unit 824, and one transceiver 826 for access terminal 120, (c) one controller/processor 830, one memory 832, one communication unit 834, and one transceiver 836 for radio network 130, and (d) one controller/processor 840, one memory 842, and one communication unit 844 for PDSN 140. In general, each entity may include any number of controllers, processors, memories, transceivers, communication units, etc.

On the downlink, a base station in radio network 130 transmits traffic data, signaling/messages, and pilot to access terminals within its coverage area. These various types of data are processed by processor 830 and conditioned by transceiver 836 to generate a downlink signal, which is transmitted via a base station antenna. At access terminal 120, the downlink signal from the base station is received via an antenna, conditioned by transceiver 826, and processed by processor 820 to obtain traffic data, signaling, etc. Processor 820 may perform processing for access terminal 120 in the call flows described above and may also perform process 600 in FIG. 6 and/or other processes to support concurrent data services with different credentials.

On the uplink, access terminal 120 may transmit traffic data, signaling, and pilot to the base station. These various types of data are processed by processor 820 and conditioned by transceiver 826 to generate an uplink signal, which is transmitted via the access terminal antenna. At radio network 130, the uplink signal from access terminal 120 is received and conditioned by transceiver 836 and further processed by processor 830 to obtain traffic data, signaling, etc. Memories 822 and 832 store program codes and data for access terminal 120 and radio network 130, respectively. Radio network 130 may communicate with other network entities via communication unit 834.

Within terminal device 110, processor 810 performs processing for the terminal device and further directs the operation of various units within the terminal device. Memory 812 stores program codes and data for terminal device 110. Communication units 814 and 824 support communication between terminal device 110 and access terminal 120.

Within PDSN 140, processor 840 performs processing for the PDSN and further directs the operation of various units within the PDSN. Memory 842 stores program codes and data for PDSN 140. Communication unit 844 allows PDSN 140 to communicate with other entities. Processor 840 may perform processing for PDSN 140 in the call flows described above and may also perform process 700 in FIG. 7 and/or other processes to support concurrent data services with different credentials.

The techniques described herein may be implemented by various means. For example, these techniques may be implemented in hardware, firmware, software, or a combination thereof For a hardware implementation, the processing units used to perform the techniques at an entity (e.g., access terminal 120, PDSN 140, etc.) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 812, 822, 832 or 842 in FIG. 8) and executed by a processor (e.g., processor 810, 820, 830 or 840). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor configured
to send first authentication credentials via a Point-to-Point Protocol (PPP) link to a Packet Data Serving Node (PDSN),
to receive an indication of successful authentication for a first data service based on the first authentication credentials,
to receive a request for a second data service different from the first data service and second authentication credentials for authenticating to the second data service from a terminal device,
to send the second authentication credentials via the PPP link to the PDSN in response to the request for the second data service while the first data service is ongoing, wherein the sending of second authentication credentials comprises
sending a Configure-Request packet with the second authentication credentials to initiate authentication for the second data service,
receiving a Challenge-Handshake Authentication Protocol (CHAP) Challenge packet from the PDSN in response to the Configure-Request packet, and
sending a CHAP Response packet with the second authentication credentials to the PDSN, and to receive an indication of successful authentication for the second data service based on the second authentication credentials; and a memory coupled to the processor,
wherein the processor is configured to receive inbound packets from the PDSN for the first and second data services, to pass inbound packets for the first data service up a protocol stack at the apparatus, and to forward inbound packet for the second data service to the terminal device.

2. The apparatus of claim 1, wherein the processor is configured to perform authentication with the PDSN using Challenge-Handshake Authentication Protocol (CHAP).

3. The apparatus of claim 2, wherein the processor is configured to send a Configure-Request packet in Internet Protocol Control Protocol (IPCP) or IP Version 6 Control Protocol (IPv6CP) to trigger authentication for the second data service.

4. An apparatus, comprising:
a processor configured
to send first authentication credentials via a Point-to-Point Protocol (PPP) link to a Packet Data Serving Node (PDSN),
to receive an indication of successful authentication for a first data service based on the first authentication credentials,
to receive a request for a second data service different from the first data service and second authentication credentials for authenticating to the second data service from a terminal device,
to send the second authentication credentials via the PPP link to the PDSN in response to the request for the second data service while the first data service is ongoing, wherein the sending of second authentication credentials comprises
performing authentication with the PDSN using Password Authentication Protocol (PAP), and
to receive an indication of successful authentication for the second data service based on the second authentication credentials; and
a memory coupled to the processor,
wherein the processor is configured to receive inbound packets from the PDSN for the first and second data services, to pass inbound packets for the first data service up a protocol stack at the apparatus, and to forward inbound packet for the second data service to the terminal device.

5. The apparatus of claim 4, wherein the processor is configured to send a PAP Authenticate-Request packet with the second authentication credentials to initiate authentication for the second data service.

6. The apparatus of claim 1, wherein the processor is configured to perform authentication with the PDSN using a first authentication protocol for the first data service, and to perform authentication with the PDSN using a second authentication protocol different from the first authentication protocol for the second data service.

7. The apparatus of claim 1, wherein the processor is configured to establish a first connection to a first network entity for the first data service and to establish a second connection to a second network entity for the second data service.

8. The apparatus of claim 7, wherein the PDSN and first network entity are in a first network and the second network entity is in a second network.

9. The apparatus of claim 1, wherein the processor is configured to configure a first network-layer protocol for the first data service using a first Network Control Protocol (NCP), and to configure a second network-layer protocol for the second data service using a second NCP.

10. The apparatus of claim 1, wherein the processor is configured to configure Internet Protocol Version 6 (IPv6) for the first data service and to configure Internet Protocol Version 4 (IPv4) for the second data service.

11. The apparatus of claim 1, wherein the first and second data services utilize different Internet Protocol (IP) versions, and wherein the processor is configured to identify inbound packets for the first and second data services based on an IP version included in each inbound packet.

12. The apparatus of claim 1, wherein the first data service is obtained by the apparatus from a first network and the second data service is obtained by the terminal device from a second network.

13. The apparatus of claim 1, wherein the first data service is an IP Multimedia Subsystem (IMS) service and the second data service is an Internet service.

14. A method executed in an apparatus, comprising:
sending first authentication credentials via a Point-to-Point Protocol (PPP) link to a Packet Data Serving Node (PDSN);
receiving an indication of successful authentication for a first data service based on the first authentication credentials;
receiving a request for a second data service different from the first data service and second authentication credentials for authenticating to the second data service from a terminal device;
sending second authentication credentials via the PPP link to the PDSN in response to the request for the second data service while the first data service is ongoing, wherein the sending the second authentication credentials comprises:
sending a Configure-Request packet to trigger authentication for the second data service;
receiving a Challenge-Handshake Authentication Protocol (CHAP) Challenge packet from the PDSN in response to the Configure-Request packet; and
sending a CHAP Response packet with the second authentication credentials to the PDSN;
receiving an indication of successful authentication for a second data service based on the second authentication credentials;
receiving inbound packets from the PDSN for the first and second data services;
passing inbound packets for the first data service up a protocol stack at the apparatus; and
forwarding inbound packets for the second data service to the terminal device.

15. A method executed in an apparatus, comprising:
sending first authentication credentials via a Point-to-Point Protocol (PPP) link to a Packet Data Serving Node (PDSN);
receiving an indication of successful authentication for a first data service based on the first authentication credentials;
receiving a request for a second data service different from the first data service and second authentication credentials for authenticating to the second data service from a terminal device;
sending second authentication credentials via the PPP link to the PDSN in response to the request for the second data service while the first data service is ongoing, wherein the sending the second authentication credentials comprises sending a Password Authentication Protocol (PAP) Authenticate-Request packet with the second credentials to initiate authentication for the second data service;
receiving inbound packets from the PDSN for the first and second data services;
passing inbound packets for the first data service up a protocol stack at the apparatus; and
forwarding inbound packets for the second data service to the terminal device.

16. An apparatus, comprising:
means for sending first authentication credentials via a Point-to-Point Protocol (PPP) link to a Packet Data Serving Node (PDSN);
means for receiving an indication of successful authentication for a first data service based on the first authentication credentials;
means for receiving a request for a second data service different from the first data service and second authentication credentials for authenticating to the second data service from a terminal device;
means for sending second authentication credentials via the PPP link to the PDSN in response to the request for the second data service while the first data service is ongoing, wherein said means for sending the second authentication credentials comprises:
means for sending a Configure-Request packet to trigger authentication for the second data service,
means for receiving a Challenge-Handshake Authentication Protocol (CHAP) Challenge packet from the PDSN in response to the Configure-Request packet, and
means for sending a CHAP Response packet with the second authentication credentials to the PDSN;
means for receiving an indication of successful authentication for a second data service based on the second authentication credentials;
means for receiving inbound packets from the PDSN for the first and second data services;
means for passing inbound packets for the first data service up a protocol stack at the apparatus; and
means for forwarding inbound packets for the second data service to the terminal device.

17. An apparatus, comprising:
means for sending first authentication credentials via a Point-to-Point Protocol (PPP) link to a Packet Data Serving Node (PDSN);
means for receiving an indication of successful authentication for a first data service based on the first authentication credentials;
means for receiving a request for a second data service different from the first data service and second authentication credentials for authenticating to the second data service from a terminal device;
means for sending second authentication credentials via the PPP link to the PDSN in response to the request for the second data service while the first data service is ongoing, wherein the means for sending the second authentication credentials comprises
means for sending a Password Authentication Protocol (PAP) Authenticate-Request packet with the second authentication credentials to initiate authentication for the second data service;
means for receiving inbound packets from the PDSN for the first and second data services;
means for passing inbound packets for the first data service up a protocol stack of the processor; and
means for forwarding inbound packets for the second data service to the terminal device.

18. A non-transitory processor readable storage medium having stored thereon processor-executable software instructions configured to cause a processor to perform steps comprising:
sending first authentication credentials via a Point-to-Point Protocol (PPP) link to a Packet Data Serving Node (PDSN);

receiving an indication of successful authentication for a first data service based on the first authentication credentials;

receiving a request for a second data service different from the first data service and second authentication credentials for authenticating to the second data service from a terminal device;

sending second authentication credentials via the PPP link to the PDSN in response to the request for the second data service while the first data service is ongoing, wherein the sending the second authentication credentials comprises:

sending a Configure-Request packet to trigger authentication for the second data service;

receiving a Challenge-Handshake Authentication Protocol (CHAP) Challenge packet from the PDSN in response to the Configure-Request packet; and sending a CHAP Response packet with the second authentication credentials to the PDSN;

receiving an indication of successful authentication for a second data service based on the second authentication credentials;

receiving inbound packets from the PDSN for the first and second data services;

passing inbound packets for the first data service up a protocol stack of the processor; and forwarding inbound packets for the second data service to the terminal device.

19. A non-transitory processor readable storage medium having stored thereon processor-executable software instructions configured to cause a processor to perform steps comprising:

sending first authentication credentials via a Point-to-Point Protocol (PPP) link to a Packet Data Serving Node (PDSN);

receiving an indication of successful authentication for a first data service based on the first authentication credentials;

receiving a request for a second data service different from the first data service and second authentication credentials for authenticating to the second data service from a terminal device;

sending second authentication credentials via the PPP link to the PDSN in response to the request for the second data service while the first data service is ongoing, wherein the sending the second authentication credentials comprises sending a Password Authentication Protocol (PAP) Authenticate-Request packet with the second credentials to initiate authentication for the second data service;

receiving inbound packets from the PDSN for the first and second data services;

passing inbound packets for the first data service up a protocol stack at the apparatus; and forwarding inbound packets for the second data service to the terminal device.

\* \* \* \* \*